United States Patent Office 3,748,343
Patented July 24, 1973

---

3,748,343
QUATERNARY THENYL AMMONIUM SALTS
Peter F. Epstein, Prairie Village, Kans., Joseph R. Caffrey, Independence, Mo., and Pyung Kyung Yu, Overland Park, Kans., assignors to Chemagro Corporation, Kansas City, Mo.
No Drawing. Filed Feb. 17, 1971, Ser. No. 116,258
Int. Cl. C07d 63/14
U.S. Cl. 260—332.5                                    8 Claims

ABSTRACT OF THE DISCLOSURE

Quaternary thenyl ammonium salts, i.e. [(optionally 2, 3, 4 and/or 5 halo, alkyl, cyano, alkoxycarbonyl and/or nitro-substituted)-5 or 4-thenyl]-[tri(same or mixed) alkyl, alkenyl, alkinyl, substituted alkyl, cycloalkyl, heterocyclic and/or aryl]-ammonium salts, i.e. halides, nitrates, azides, thiocyanates, sulfates, phosphates, O-ethyl-xanthates, etc., which possess plant-growth regulating properties, including synergistic properties.

---

The present invention relates to and has for its objects the provision of particular new quaternary thenyl ammonium salts, i.e. [optionally 2,3,4 and/or 5-mono-di and tri [same or mixed] halo, alkyl, cyano, alkoxycarbonyl, and/or nitro substituted)-5- or 4-thenyl]-[tri(same or mixed) alkyl, alkenyl, alkinyl, substituted alkyl, cycloalkyl, heterocyclic and/or aryl]-ammonium salts, i.e. halides, nitrates, azides, thiocyanates, sulfates, phosphates, O-ethyl xanthates, N-methyl-dithiocarbamates, etc., which possess valuable plant-growth regulating properties, including synergistic properties; active compositions in the form of mixtures of such compounds with solid and liquid dispersible carrier vehicles; and methods for producing such compounds and for using such compounds in a new way, especially for regulating, e.g., selectively retarding and/or promoting, the growth of plants or vegetation of the most varied kinds, including synergistic plant growth regulation, with other and further objects of the invention becoming apparent from a study of the within specification and accompanying examples.

It is known in the prior art that compounds such as the quaternary ammonium compound (2-chloroethyl)-trimethyl ammonium chloride (Cycosel) of the formula

can be used to control the growth of vegetation (cf., e.g. N.E. Tolbert, J. Plant Physiology, 35 p. 380 (1960)).

Furthermore, maleic hydrazide (B), which may be designated (MH-30), is also known individually as a plant growth regulant.

It has been found, in accordance with the present invention, that the particular new quaternary thenyl ammonium salts, i.e. (optionally halogen, alkyl, cyano, alkoxycarbonyl and/or nitro substituted 4- and 5-thenyl)-(tri- alkyl, alkenyl, alkinyl, substituted alkyl, cycloalkyl and/or aryl ammonium salts, having the general formulae

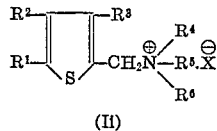

(II)

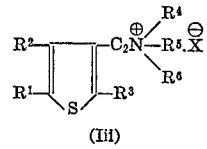

(Ii)

in which $R^1$, $R^2$ and $R^3$ each individually is hydrogen, halogen, alkyl, cyano, alkoxycarbonyl and/or nitro
$R^4$, $R^5$ and $R^6$ each individually is an alkyl, alkenyl, alkinyl, substituted alkyl, cycloalkyl, heterocyclic and/or optionally substituted aryl radical, and
$X^\ominus$ is an anion such as halogen, pseudo-halogen, and other anions, exhibit strong growth-controlling, in particular growth-inhibiting, effects without significant concomitant phytotoxic effects.

It has furthermore been found, in accordance with the present invention, that the compounds of Formulae Ii and Iii above may be produced by a process which comprises reacting a corresponding thenyl halide of the formula

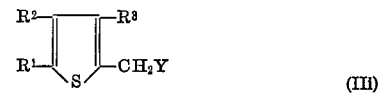

(II)

or

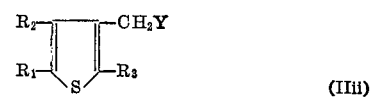

(IIii)

in which $R^1$, $R^2$ and $R^3$ are the same as defined above, and Y is halogen with a tertiary amine of the formula

(III)

in which $R^4$, $R^5$ and $R^6$ are the same as defined above, optionally in the presence of a solvent.

The nature of the anionic portion of the resulting molecule of the specific halide compound of Formula Ii or Iii above so produced, i.e. $X^\ominus$ as defined above, can be varied, for example, by further reacting such specific halide compound of Formula Ii or Iii with the alkali metal (e.g. sodium, potassium, and the like) or silver salt (IV) of the desired anion, by the use of a suitable anion exchange resin, or in other conventional ways which are readily apparent to anyone skilled in the art.

Surprisingly, the compounds of Formulae Ii and Iii above according to the present invention show a more pronounced growth regulatory activity, than the analogous quaternary ammonium compounds known from the prior art, such as compound (A) noted above, which is chemically the closest active compounds having the same type of activity.

Furthermore, according to the teachings of N. E. Tolbert (loc.cit.) the compounds corresponding to his invention are derivatives of trimethyl amine, whereas the compounds of the present invention show their greatest activity when at least one or preferably more than one of the groups $R^4$, $R^5$ and $R^6$ is $C_4$ alkyl; or in which the sum of the carbon atoms in $R^4$, $R^5$ and $R^6$ taken together lies between about 9 and 15.

Additionally, unlike such analogous compounds of the prior art, the instant active compounds enhance synergistically the known biological efficacy of, for instance, compound (B), maleic hydrazide (MH–30), while reducing the undesirable phytotoxicity associated with the use thereof alone at comparable rates. The active compounds according to the present invention therefore represent a valuable contribution to the art.

If, for instance, 2-bromo-5-thenyl chloride (IIa) and tri-n-butyl amine (IIIa) are used as starting materials, the course of the reaction can be represented by the following reaction scheme:

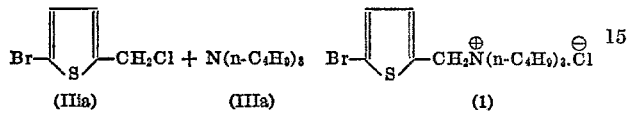

The course of the anion exchange reaction in which 2-bromo-5-thenyl-(tri-n-butyl)-ammonium chloride (1) and silver nitrate are used as starting materials can be represented by the following equation:

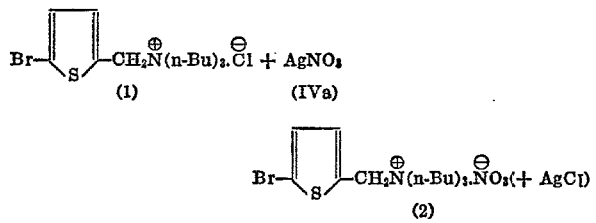

Advantageously, in accordance with the present invention, in the various formulae herein:

$R^1$, $R^2$ and $R^3$ each individually represents
hydrogen;
halo such as chloro, bromo, iodo and/or fluoro, especially chloro and/or bromo;
straight and branched chain lower alkyl hydrocarbon of 1–4 carbon atoms such as methyl, ethyl, n- and iso-propyl, n-, iso-, sec.- and tert.-butyl, and the like;
cyano;
alkoxycarbonyl such as methoxycarbonyl, ethoxycarbonyl isobutoxycarbonyl and the like; or
nitro.

$R^4$, $R^5$ and $R^6$ each individually represents
straight and branched chain alkyl hydrocarbon of 1–12 carbon atoms such as methyl to tert.-butyl inclusive as defined above, pentyl, isopentyl, hexyl, heptyl, n- and iso- octyl, nonyl, decyl, undecyl, dodecyl, and the like, especially lower alkyl, $C_{3-12}$ or $C_{3-6}$ alkyl, and $C_3$ or $C_4$, $C_5$ and $C_6$ alkyl, and more especially n-butyl (i.e. n-Bu), iso-butyl, n-propyl, n-pentyl and isopentyl.
alkenyl hydrocarbon such as vinyl, allyl and the like
alkinyl hydrocarbon such as propargyl and the like
substituted alkyl, such as cyanoalkyl, alkoxyalkyl and the like
cycloalkyl such as cyclohexyl, cyclopentyl and the like
heterocyclic such as morpholino and the like
aromatic hydrocarbon such as phenyl, substituted phenyl and the like
such that $R^4$, $R^5$ and $R^6$ are the same or different or that $R^4$ and $R^5$ taken together represent a saturated heterocyclic moiety.

$X^\ominus$ is an anion derived from
an inorganic acid such as e.g., nitric, nitrous, sulfuric, phosphoric, boric, hydrothiocyanic, cyanic, perchloric, periodic, hydrocyanic, carbonic, hydrofluoric, hydrochloric, hydrobromic, hydroiodic, hydrazoic acid or hydrogen sulfide or from an organic acid such as alkanoic acids, i.e., (same or mixed) mono, di, or tri-bromo, chloro or fluoro-acetic, n-, or iso-propionic, n- iso-, or tert-butyric, etc., acids or substituted carboxylic acid such as (same or mixed) mono, di- or tri-bromo, chloro or fluoro alkoxy or aryloxy (e.g., 2,4-dichloro phenyl or 2,4-dichlorophenoxy) acetic acid, or aryl alkanoic acid such as phenylacetic acid or from an aromatic acid such as benzoic (same or mixed) mono-, di-, or tri-iodo, bromo- or chlorobenzoic acid, or methoxybenzoic, nitrobenzoic;

or from a carbonic acid such as e.g., methyl, ethyl, n- and isopropyl, n-, iso, sec- and tert-butyl, etc., thiocarbonic acid, phenyl thiocarbonic and (same or mixed) mono-di- or tri-chloro, bromo, iodo, lower alkyl, alkoxy, phenyl carbonic acid and the corresponding di- or tri-thiocarbonic acids;

or mono or di- (same or mixed) alkyl or aryl mono-di-, tri- or tetra-thiophosphoric; mono, di- or trithiophosphonic or mono-dithio-phosphinic acids, e.g., O,O-diphenyl phosphonothioic acid, O-alkyl methanephosphonothioic acid diphenyl phosphinodithoic acid, etc.

or alkyl and aryl sulfonic and sulfinic acid, e.g. benzene sulfonic acid, methanesulfinic acid, etc.

or in which $X^\ominus$ is an anion derived from a mercaptan $R^7SH$ (i.e., has the structure $\ominus SR$) in which $R^7$ is alkyl, substituted alkyl, aryl, substituted aryl, cycloalkyl, heterocyclic and the like.

It will be noted that the point of attachment of the nitrogen bearing side chain to the thiophene ring can be either in the 4- or 5- position of the nucleus depending on the intermediate used and on the nature of the substituents $R^1$, $R^2$ and $R^3$.

Most preferably, $R^1$, $R^2$ and $R^3$ are hydrogen, bromo, chloro, cyano or alkoxycarbonyl; $R^4$, $R^5$ and $R^6$ are each lower alkyl; and $X^\ominus$ is a monovalent anion such as chloride, nitrate, thiocyanate or azide.

Preferred compounds of the present invention include (1) (2-bromo-5-ethenyl)-(tri-n-butyl)-ammonium chloride
(2) (2-bromo-5-thenyl)-(tri-n-butyl)-ammonium nitrate
(3) (2-bromo-5-thenyl)-(tri-n-butyl)-ammonium thiocyanate
(4) (2-chloro-5-thenyl)-(tri-n-butyl)-ammonium chloride
(5) (2,5-dichloro-4-thenyl)-(tri-n-propyl)-ammonium chloride
(6) (2-chloro-5-thenyl)-(tris-iso-amyl)-ammonium chloride
(7) (2-bromo-5-thenyl)-(tris-iso-amyl)-ammonium chloride
(8) (2-bromo-5-thenyl)-(methyl-di-iso-butyl)-ammonium chloride
(9) (2,5-dibromo-4-thenyl)-(tri-n-propyl)-ammonium chloride
(10) (2-bromo-5-thenyl)-triethyl-ammonium chloride
(11) (2,5-dibromo-4-thenyl)-(tri-n-butyl)-ammonium chloride
(12) (2-bromo-5-thenyl)-(tri-i-n-propyl)-ammonium chloride
(13) (2-bromo-5-thenyl)-(methyl-di-n-butyl)-ammonium chloride
(14) (2-bromo-5-thenyl)-(allyl-diethyl)-ammonium chloride
(15) (2-bromo-5-thenyl)-(ethyl-di-iso-propyl)-ammonium chloride
(16) (2-chloro-5-thenyl)-(cyclohexyl-dimethyl) ammonium chloride
(17) (2-bromo-5-thenyl)-(cyclohexyl-dimethyl)-ammonium chloride

(18) (2-chloro-5-thenyl)-(methyl-diethyl)-ammonium chloride
(19) (2-bromo-5-thenyl)-(methyl-diethyl)ammonium chloride
(20) (2-bromo-5-thenyl)-(phenyl-dimethyl)-ammonium chloride
(21) (2-chloro-5-thenyl)-(phenyl-dimethyl)-ammonium chloride
(22) 2-thenyl-triethyl-ammonium chloride
(23) (2,5-dichloro-4-thenyl)-triethyl-ammonium chloride
(24) 2-thenyl-(tri-n-butyl)-ammonium chloride
(25) (2-bromo-5-thenyl)-trimethyl-ammonium chloride
(26) (2,5-dichloro-4-thenyl)-(tri-n-butyl)ammonium chloride
(27) (2-chloro-5-thenyl)-(tri-n-propyl)-ammonium chloride
(28) (2-chloro-5-thenyl)-(methyl-di-n-butyl)-ammonium chloride
(29) (2,5-dichloro-4-thenyl)-(methyl-di-n-butyl)-ammonium chloride
(30) (2-chloro-5-thenyl)-(tris-n-amyl)-ammonium chloride
(31) (2-bromo-5-thenyl)-(tris-n-amyl)-ammonium chloride
(32) (2-bromo-5-thenyl)-trimethyl-ammonium nitrate
(33) (2,5-dichloro-4-thenyl)-(tri-n-butyl)-ammonium chloride
(34) (2,5-dichloro-4-thenyl)-(tri-n-butyl)-ammonium chloride
(35) (2-chloro-5-thenyl)-(allyl-dimethyl)ammonium chloride
(36) (2-bromo-5-thenyl)-[(2-cyanoethyl)-diethyl]-ammonium chloride
(37) (2-chloro-5-thenyl)-[(2-cyanoethyl)-diethyl]-ammonium chloride
(38) (2-chloro-5-thenyl-(methyl-di-iso-butyl)-ammonium chloride
(39) (2,5-dichloro-4-thenyl)-(methyl-di-iso-butyl)-ammonium chloride
(40) (2,5-dichloro-4-thenyl)-N-ethyl-morpholinium chloride
(41) (2-chloro-5-thenyl)-(tris-propargyl)-ammonium chloride
(42) (2-bromo-5-thenyl)-(tris-propargyl)-ammonium chloride
(43) (2-chloro-5-thenyl)-N-ethyl-morpholinium chloride
(44) (2-bromo-5-thenyl)-N-ethyl-morpholinium chloride
(45) (2-chloro-5-thenyl)-N-phenyl-morpholinium chloride
(46) (2-bromo-5-thenyl)-N-phenyl-morpholinium chloride
(47) (2-chloro-5-thenyl)-triallyl-ammonium chloride
(48) (2-bromo-5-thenyl)-triallyl-ammonium chloride
(49) (2,5-dichloro-4-thenyl)-triallyl-ammonium chloride
(50) (2-cyano-5-thenyl)-(tri-n-butyl)-ammonium chloride
(51) (2-bromo-3-methyl-4-thenyl)-tributyl-ammonium chloride
(52) (2-chloro-5-thenyl)-(cyclohexyl-dimethyl)-ammonium, N,N-dimethyl dithio carbamate
(53) (2-iso-butoxycarbonyl-5-thenyl)-(tri-n-butyl)-ammonium chloride
(54) (2-iso-butoxycarbonyl-5-thenyl)-(tris-iso-amyl)-ammonium chloride
(55) (2-iso-butoxycarbonyl-5-thenyl)-(methyl-dis-iso-butyl)-ammonium chloride
(56) (2-bromo-5-thenyl)-(tri-n-butyl)-ammonium azide
(57) (2-chloro-5-thenyl)-(tri-n-butyl)-ammonium nitrate
(58) (2-chloro-5-thenyl)-(tri-n-butyl)-ammonium thiocyanate In accordance with one embodiment of the present invention, $R^1$, $R^2$ and $R^3$ each individually is hydrogen; or one or more is selected from the group consisting of chloro, bromo, lower alkyl of $C_{1-5}$ carbon atoms, lower alkoxycarbonyl of 1–5 carbon atoms, cyano or nitro;

$R^4$, $R^5$ and $R^6$ each individually are lower alkyl groups of 1–5 carbon atoms, alkenyl groups of 2–5 carbon atoms or cycloalkyl groups of 4–7 carbon atoms;

and $X^\ominus$ is a chloride, nitrate or thiocyanate ion;

and more specifically, in Formula Ii above, $R^1$ is chloro or bromo, $R^2$ and $R^3$ are both hydrogen, $R^4$, $R^5$ and $R^6$ are selected from n-butyl, iso-butyl, iso-amyl, methyl, ethyl, n-propyl, cyclohexyl and iso-propyl; with the proviso that the total number of carbon atoms in $R^4$, $R^5$ and $R^6$ taken together lies between about 8 and 16; and $X^\ominus$ is a chloride, nitrate or thiocyanate ion; whereas in Formula Iii above, $R^1$ and $R^2$ are both chloro or bromo, $R^3$ is hydrogen, and $R^4$, $R^5$, $R^6$ and $X^\ominus$ have the same meanings as defined above.

Preferably, $R^1$, $R^2$ and $R^3$ each individually is hydrogen or halo, especially chloro or bromo; $R^4$, $R^5$ and $R^6$ each individually is $C_{1-12}$ alkyl, especially $C_{2-8}$ or $C_{3-5}$ or $C_3$, $C_4$ or $C_5$ alkyl; or cyclohexyl, or phenyl; and X is a halide, especially chloride ion or a nitrate ion; or a thiocyanate ion, or an azide ion.

More particularly $R^1$ and $R^3$ each individually is hydrogen; or chloro; or bromo; $R^2$ is hydrogen; $R^4$, $R^5$ and $R^6$ are individually n-propyl, iso-propyl, n-butyl, iso-butyl or iso-amyl and $X^\ominus$ is a chloride ion or a nitrate ion or a thiocyanate ion.

Most particularly, in Formula Ii above, $R^1$ is bromo or chloro $R^2$ and $R^3$ are both hydrogen; $R^4$, $R^5$ and $R^6$ individually are n-butyl, n-propyl, iso-amyl, or iso-butyl, or methyl, provided that the total number of carbon atoms in $R^4$ and $R^5$ and $R^6$ taken together lies between about 9 and 15, and X is a chloride, nitrate or thiocyanate ion; whereas in Formula Iii above, $R^1$ and $R^3$ are both chloro, or both bromo, $R^2$ is hydrogen, and $R^4$, $R^5$, $R^6$ and $X^\ominus$ have the meanings as defined above.

The types of starting thenyl halides usable in accordance with the process of the present invention are clearly characterized by Formulae Ii and Iii noted above.

These starting compounds are well known and can be prepared readily on an industrial scale. (See e.g. Henry D. Norris, U.S. Pat. 2,623,049).

As examples of such starting thenyl halides which can be used in accordance with the present invention, there may be mentioned in particular:

2-thenyl chloride
3-thenyl bromide
2-chloro-5-thenyl chloride
2-bromo-5-thenyl chloride
2-methyl-5-thenyl chloride
2,5-dichloro-4-thenyl chloride
2,5-dibromo-4-thenyl chloride
2,3,5-trichloro-4-thenyl chloride
2,3,4-trichloro-5-thenyl chloride
2,3,4-tribromo-5-thenyl chloride
2-nitro-5-thenyl chloride
2-chloro-4-nitro-5-thenyl chloride
2,5-dichloro-3-nitro-4-thenyl chloride
2-ethoxycarbonyl-5-thenyl chloride
2-isobutoxycarbonyl-5-thenyl chloride
2-cyano-5-thenyl chloride
2-bromo-5-chloro-3-thenyl chloride
5-iodo-2-thenyl chloride
5-fluoro-2-thenyl chloride
2-methyl-5-chloro-3-thenyl chloride
2,5-dimethyl-3-thenyl chloride, and the like.

The types of starting trialkyl or other tertiary amines usable in accordance with the process of the present invention are clearly characterized by Formula III noted above.

These starting compounds are also well known and can be prepared readily on an industrial scale.

As examples of such starting trialkylamines or other tertiary amines which can be used in accordance with the present invention, there may be mentioned in particular:

tri-n-butyl amine
tri-iso-butyl amine
tris-iso-amyl amine
methyl-di-iso-butyl amine
tri-n-propyl amine
and the like.

The production reaction is carried out preferably in the presence of a solvent (this term includes a mere diluent), particularly one in which the solubility of the final product is not very high and which is inert to the reaction. Examples of such solvents include inert organic solvents, for example, hydrocarbons such as n-hexane, n-heptane, benzine, benzene and toluene; ethers such as diethyl ether, dioxane and tetrahydrofuran; lower boiling aliphatic nitriles such as acetonitrile; amides such as dimethyl formamide; alkyl sulfoxides such as dimethyl sulfoxide; aliphatic ketones such as acetone; chlorinated aliphatic hydrocarbons such as chloroform and dichloromethane; and the like; aliphatic alcohol esters of aliphatic carboxylic acids such as ethyl acetate and the like; and any desired mixtures of these solvents.

The use of anhydrous and non-hydroxylic solvents and the absence of oxygen are desirable factors in the optimization of yield and product quality but are not essential to the success of the reaction.

The reaction temperature can be varied within a fairly wide range. In general the reaction is carried out at substantially between about $-20°$ C. and $+130°$ C. preferably between about $20°$ C. and $80°$ C.

In general, for economy and efficiency, the reactants are used in approximately equimolar proportions. The reaction can, for example, be carried out in such a manner that the thenyl halide, for example 2-bromo-5-thenyl chloride, is added to a solution of the amine, for example tri-n-butyl amine, in anhydrous acetonitrile at room temperature, and the reaction mixture heated under reflux for several hours, followed by removal of solvent. The resulting solid crystalline product can be obtained in a substantially pure form by recrystallization from a suitable solvent.

The 5- (or 4-) thenyl trialkyl ammonium halides thus prepared can, if desired, be converted into other anionic ammonium salts of the desired anionic component in the conventional manner in a solvent such as acetone, ethanol or dimethyl formamide in which both of the reagents are appreciably soluble. After separation of the metal halide (e.g. sodium, potassium, silver, and the like halide) formed in the reaction, removal of the solvent under reduced pressure yields the desired salt in substantially pure form. Alternatively, a suitable anionic exchange resin can be employed.

Advantageously, the active compounds according to the present invention exhibit strong growth-regulatory properties. Such compounds can therefore be used to affect the rate of growth of plants. Since at rates and in concentrations showing high growth regulatory activity the instant active compounds have little or no phytotoxic action, these effects on plant growth can be obtained with little or no damage to useful plants. The instant compounds also possess comparatively low mammalian toxicity.

By plants are meant in the broadest sense all useful vegetation including valuable agricultural, horticultural, fruiticultural, and the like, crop vegetation, weeds, etc., the growth regulation of which is desired.

Thus, the active compounds according to the present invention can be used— for stunting or retarding the growth of monocotyledenous and dicotyledenous crop and weed plants, ornamental plants, shrubs, and trees;

for increasing beneficially the yield, oil yield and protein yield of leguminous plants such as soybeans, lima beans, snap beans, peas, and the like;

for increasing the sugar content or yield of plants such as sugar beet, sugar cane, and the like;

for affecting the fruit set of spermatophytic plants, i.e., apples, peaches and other fruit of fruitbearing trees, shrubs or crop plants;

for increasing the yield of cotton plants;

for increasing the resistance of vegetation, particularly fruit trees, to the damage caused by frost and drought;

for retarding the growth of grasses such as Kentucky bluegrass, fescue, and the like, by reducing both the clipping weight per unit area and the plant height, and thus providing a means of chemical mowing;

for increasing the yield or general commercial value of various food crop plants such as coffee, tea, cocoa, dates, coconuts, bananas and the like;

for enhancing synergistically the action of maleic hydrazide (MH–30) in retarding the growth of grasses such as Kentucky bluegrass, fescue, and the like, by reducing both the clipping weight per unit area and the plant height, thus also providing such chemical moving;

for reducing synergistically the tendency of maleic hydrazide (MH–30), when used alone at comparable rates, to produce phytotoxic injury to grass plants such as Kentucky bluegrass, fescue, and the like;

for increasing the yield of natural products extracted from plants on a commercial scale, e.g. alkaloids, pyrethrins, rubber and the like;

for inhibiting or partially inhibiting the undesirable growth of suckers on plants, particularly tobacco plants;

for enhancing synergistically the effect of maleic hydrazide (MH–30) for the aforesaid use of inhibiting undesirable growth of suckers on plants, without inflicting appreciable phytotoxic damage or otherwise affecting adversely the quality of the crop;

for affecting, i.e., breaking the dormancy of plants, such as potato plants and the like, by causing them to sprout.

As aforesaid, significantly, the instant active compounds can be used in the form of foliar sprays without appreciable phytotoxicity or destruction of chlorophyll, i.e. at the biologically efficacious rates normally applied.

The active compounds according the instant invention can be utilized, if desired, in the form of the usual formulations or compositions with conventional, preferably inert (i.e. plant compatible or herbicially inert), pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compound with conventional pesticide dispersible liquid diluent carriers and/or dispersible solid carriers, optionally with the use of carrier vehicle assistants, e.g., conventional pesticide surface-active agents, including emulsifying agents and/or dispersing agents whereby, for example, in the case where water is used as diluent, organic solvents may be added as auxiliary solvents. The following may be chiefly considered for use as conventional carrier vehicles for the purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. dichloromethane, etc.), alcohols (e.g. methanol, ethanol, propanol, butanol, etc.), amines (e.g. 2-aminoethanol, etc.), ethers, ether-alcohols (e.g. 2-methoxyethanol, etc.), amides (e.g. dimethyl formamide etc.), sulfoxides (e.g. dimethyl sulfoxide, etc.), ketones (e.g.

acetone, etc.) and/or water; as well as inert dispersible finely divided solid carriers, such as ground natural minerals (e.g. kaolin, alumina, silica, chalk, i.e., calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as conventional plant-growth regulators, fungicides, insecticides, nematicides bactericides, selective herbicides, etc., if desired, or in the form of particular dosage preparations for specific application made therefrom, such as solutions, emulsions, suspensions, powders, pastes and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application of field application generally contemplate those in which the active compound is present in an amount substantially between about 0.01–5.0%, preferably 0.01–0.8%, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. surface active agent, such as an emulsifying agent and/or a dispersing agent, and an amount of the active compound which is effective for the purpose in question and which is generally between about 0.01–95%, and preferably 0.01–5.0%, by weight of the mixture.

Conveniently, the instant active compounds, having appreciable solubility in water, are preferably usable in the form of aqueous solutions containing substantially between 0.01% and 5%, preferably 0.01%–0.8%, by weight of the active compound, with or without the addition of stabilizer, surface active agents, etc., as mentioned above. Such solutions are particularly useful for direct foliar spray application, in which as noted above (unlike the analogous quaternary phosphonium compounds of the prior art) they do not cause appreciable phytotoxic plant injury at efficacious growth regulating rates of application.

The active compounds can also be used in accordance with the wall known ultra-low-volume process with good success, i.e. by applying such compound if normally a liquid, or by applying a liquid composition containing the same, via very effective atomizing equipment, in finely divded form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively controlling the rate of growth of plants; e.g. stunting plant growth, increasing plant or fruit yield, protein yield, oil yield, sugar yield, resistance to frost and drought damage; synergizing defoliating action and inhibiting regrowth; effecting chemical mowing; preventing the growth of undesirable suckers; breaking plant dormancy and the like; which comprise applying to at least one of (a) such plants and (b) their habitat, i.e. the locus to be protected or controlled, an efficacious or growth rate controlling amount of the particular active compound of the invention alone or together with a carrier vehicle as noted above. The instant formulations or compositions are applied in the usual manner, for example, by spraying, atomizing, scattering, dusting, watering, sprinkling and the like, either to the soil around the plants, themselves, or both.

It will be realized, of course, that in connection with the use of the instant compounds for influencing the growth of plants and/or effecting the other desirable results heretofore mentioned, the concentration of the particular active compound utilized in admixture with the carrier vehicle will depend upon the intended application and may be varied within a fairly wide range depending upon the weather conditions, the purpose for which the active compound is used, e.g. growth promoting or growth retarding effect, and the plant species in which it is intended to produce the desired effect. Therefore, in special cases it is possible to go above or below the aforementioned concentration ranges.

The outstanding growth regulatory activity of the particular active compounds of the present invention is illustrated, without limitation, by the following examples.

EXAMPLE 1

Cucumber Root Growth Test

Wettable powder base consisting of:
92 parts by weight hydrated silica (ultra fine, "Hi-Sil 233")
4 parts by weight sodium lignin sulfonate ("Marasperse N")
4 parts by weight polycondensate of ethylene oxide, propylene oxide and propylene glycol (bol. wt. about 1000) "Pluronic L–61")

To produce a suitable preparation of the particular active compound, 1 part by weight of such active compound is mixed intimately with 1 part by weight of the stated wettable powder base, and the resulting mixture is diluted with water to the desired final concentration. A piece of round filter paper (150 mm. diameter) is placed in a 150 mm. x 25 mm. Petri dish, and 10 cucumber seeds are arranged in a row on the paper. The filter paper is then moistened with 7 mls. of the preparation of the given active compound.

The so-treated dish is incubated in darkness at 22° C. Rating is determined on the basis of growth response of the root during the period of twenty-four (24) hours between the third and fourth day of incubation.

A "0" to "9" scale rating is used to indicate the activity of potential growth retardants. A "0" scale reading indicates growth retardation with the range of 0–10% as compared with the control. A "9" scale reading corresponds to 90% or more growth retardation. On the other hand, figures in parentheses indicate growth promotion or enhancement. Thus, a "(0)" to "(9)" scale rating is used to indicate the activity of potential growth promotants. "(0)" indicates growth promotion within the range of 0–10% as compared with the control, whereas "(9)" indicates 90% or greater growth promotion when compared with the control.

The particular active compounds tested, the amounts used and the results obtained can be seen from the following Table 1.

TABLE 1

| Active compounds | Concentration (p.p.m.) 10,000 | 1,000 | 100 |
|---|---|---|---|
| (1) Br-[thiophene]-CH$_2$N(n-Bu)$_3^{\oplus}$·Cl$^{\ominus}$ | 9 | 9 | 9 |
| (2) Br-[thiophene]-CH$_2$N(n-Bu)$_3^{\oplus}$·NO$_3^{\ominus}$ | 9 | 9 | 9 |
| (3) Br-[thiophene]-CH$_2$N(n-Bu)$_3^{\oplus}$·SCN$^{\ominus}$ | 9 | 9 | 9 |
| (4) Cl-[thiophene]-CH$_2$N(n-Bu)$_3^{\oplus}$·Cl$^{\ominus}$ | 9 | 9 | 9 |
| (5) Cl-[thiophene]-Cl, CH$_2$N(n-Pr)$_3^{\oplus}$·Cl$^{\ominus}$ | 9 | 8 | 7 |
| (6) Cl-[thiophene]-CH$_2$N(i-C$_5$H$_{11}$)$_2^{\oplus}$·Cl$^{\ominus}$ | 9 | 9 | 7 |
| (7) Br-[thiophene]-CH$_2$N(i-C$_5$H$_{11}$)$_2^{\oplus}$·Cl$^{\ominus}$ | 9 | 9 | 8 |
| (8) Br-[thiophene]-CH$_2$N(i-Bu)$_2$(CH$_3$)$^{\oplus}$·Cl$^{\ominus}$ | 9 | 9 | 5 |
| (9) Br-[thiophene]-Br, CH$_2$N(n-Pr)$_3^{\oplus}$·Cl$^{\ominus}$ | 9 | 9 | 8 |
| (10) Br-[thiophene]-CH$_2$NEt$_3^{\oplus}$·Cl$^{\ominus}$ | 9 | 8 | 7 |
| (11) Br-[thiophene]-Br, CH$_2$N(n-Bu)$_3^{\oplus}$·Cl$^{\ominus}$ (3-position) | 9 | 9 | 7 |
| (12) Br-[thiophene]-CH$_2$N(n-Pr)$_3^{\oplus}$·Cl$^{\ominus}$ | 9 | 8 | 4 |
| (13) Br-[thiophene]-CH$_2$N(n-Bu)$_2$(CH$_3$)$^{\oplus}$·Cl$^{\ominus}$ | 9 | 9 | 7 |
| (14) Br-[thiophene]-CH$_2$N(Et)$_2$(CH$_2$CH=CH$_2$)$^{\oplus}$·Cl$^{\ominus}$ | 9 | 8 | 8 |
| (15) Br-[thiophene]-CH$_2$N(i-Pr)$_2$(Et)$^{\oplus}$·Cl$^{\ominus}$ | 9 | 8 | 6 |
| (16) Cl-[thiophene]-CH$_2$N(CH$_3$)$_2$(thiomorpholine)$^{\oplus}$·Cl$^{\ominus}$ | 9 | 9 | 9 |
| (17) Br-[thiophene]-CH$_2$N(CH$_3$)$_2$(thiomorpholine)$^{\oplus}$·Cl$^{\ominus}$ | 9 | 9 | 9 |
| (18) Cl-[thiophene]-CH$_2$N(Et)$_2$(Me)$^{\oplus}$·Cl$^{\ominus}$ | 9 | 9 | 9 |
| (19) Br-[thiophene]-CH$_2$N(Et)$_2$(Me)$^{\oplus}$·Cl$^{\ominus}$ | 9 | 9 | 9 |
| (22) [thiophene]-CH$_2$NEt$_3^{\oplus}$·Cl$^{\ominus}$ | 9 | 9 | 2 |
| (23) Cl-[thiophene]-Cl, CH$_2$NEt$_3^{\oplus}$·Cl$^{\ominus}$ | 9 | 9 | 5 |
| (24) [thiophene]-CH$_2$N(n-Bu)$_3^{\oplus}$·Cl$^{\ominus}$ | 9 | 9 | 9 |
| (25) Br-[thiophene]-CH$_2$NMe$_3^{\oplus}$·Cl$^{\ominus}$ | 9 | 9 | 2 |
| (26) Cl-[thiophene]-Cl, CH$_2$N(n-Bu)$_3^{\oplus}$·Cl$^{\ominus}$ | 9 | 9 | 9 |
| (27) Cl-[thiophene]-CH$_2$N(n-Pr)$_3^{\oplus}$·Cl$^{\ominus}$ | 9 | 9 | 7 |
| (28) Cl-[thiophene]-CH$_2$N(nBu)(CH$_3$)(n-Bu)$^{\oplus}$·Cl$^{\ominus}$ | 9 | 9 | 7 |
| (29) Cl-[thiophene]-Cl(n-Bu), CH$_2$N(nBu)(CH$_3$)$^{\oplus}$·Cl$^{\ominus}$ | 9 | 9 | 8 |
| (30) Cl-[thiophene]-CH$_2$N(n-C$_5$H$_{11}$)$_3^{\oplus}$·Cl$^{\ominus}$ | 9 | 6 | 6 |
| (31) Br-[thiophene]-CH$_2$N(n-C$_5$H$_{11}$)$_3^{\oplus}$·Cl$^{\ominus}$ | 9 | 9 | 9 |
| (32) Br-[thiophene]-CH$_2$NMe$_3^{\oplus}$·NO$_3^{\ominus}$ | 8 | 8 | 7 |
| (33) Cl-[thiophene]-Cl, CH$_2$NMe$_3^{\oplus}$·Cl$^{\ominus}$ | 9 | 9 | 9 |

TABLE 1—Continued

| Active compounds | Concentration (p.p.m.) 10,000 | 1,000 | 100 |
|---|---|---|---|
| (34) Cl—[thiophene]—Cl, —CH₂N(i-C₅H₁₁)₃·Cl | 9 | 9 | 8 |
| (35) Cl—[thiophene], —CH₂N⁺(Et)₂—CH₂CH=CH₂·Cl⁻ | 8 | 6 | 0 |
| (36) Br—[thiophene], —CH₂N⁺(Et)₂—CH₂CH₂CN·Cl⁻ | 9 | 9 | 9 |
| (37) Cl—[thiophene], —CH₂N⁺(Et)₂—CH₂CH₂CN·Cl⁻ | 9 | 7 | |
| (38) Cl—[thiophene]—, —CH₂N⁺(CH₃)(i-Bu)₂ Cl⁻ | 9 | 8 | 5 |
| (39) Cl—[thiophene]—Cl, —CH₂N⁺(CH₃)(i-Bu)₂ Cl⁻ | 9 | 8 | 7 |
| (40) Cl—[thiophene]—Cl, —CH₂N⁺(CH₃)(Et) morpholinium Cl⁻ | 8 | 5 | 0 |
| (41) Cl—[thiophene]—, —CH₂N⁺(CH₂C≡CH)₃·Cl⁻ | 9 | 6 | 5 |
| (42) Br—[thiophene]—, —CH₂N⁺(CH₂C≡CH)₃·Cl⁻ | 9 | 8 | 7 |
| (43) Cl—[thiophene]—, —CH₂N⁺(Et) morpholinium Cl⁻ | 9 | 5 | 4 |
| (44) Br—[thiophene]—, —CH₂N⁺(Et) morpholinium Cl⁻ | 8 | 6 | 2 |
| (45) Cl—[thiophene]—, —CH₂N⁺(phenyl) morpholinium Cl⁻ | 9 | 9 | 9 |
| (46) Br—[thiophene]—, —CH₂N⁺(phenyl) morpholinium Cl⁻ | 9 | 9 | 2 |
| (47) Cl—[thiophene]—, —CH₂N⁺(CH₂CH=CH₂)₃·Cl⁻ | 9 | 9 | 7 |
| (48) Br—[thiophene]—, —CH₂N⁺(CH₂CH=CH₂)₃·Cl⁻ | 9 | 9 | 5 |
| (49) Cl—[thiophene]—Cl, —CH₂N⁺(CH₂CH=CH₂)₃Cl⁻ | 9 | 9 | 8 |

EXAMPLE 2

Snap Bean Foliar Spray Test

Wettable powder base consisting of:
92 parts by weight hydrated silica (ultra fine, "Hi-Sil 233")
4 parts by weight sodium lignin sulfonate ("Marasperse N")
4 parts by weight polycondensate of ethylene oxide, propylene oxide and propylene glycol To produce a suitable preparation of the particular active compound, 1 part by weight of such active compound is mixed intimately with 1 part by weight of the stated wettable powder base, and the resulting mixture is diluted with water, containing 0.01% polyoxyethylene sorbitan monolaurate (Tween 20) as emulsifier, to the desired final concentration.

Snap bean plants, as soon as the primary leaves are relatively smooth (6–7 days old) and are capable of absorbing and translocating chemicals, are sprayed, (treated) with the given active compound preparation at the indicated concentration until just dew moist. For each test 40 mls. of the appropriate compound dilution are sprayed on 4 plants in an area of five square feet.

The so-treated plants are moved to a greenhouse and remain there for 10 to 14 days. The degree of growth response is determined by measuring three parameters: Total plant height (A), length of second node to apex (B), and petiol length of the first trifoliate leaves (C).

A "0" to "9" scale reading is used to express the degree of potential growth retardation. A "0" scale reading indicates growth retardation within the range of 0% to 10% as compared with the control. A "9" scale reading corresponds to 90% or more growth retardation.

A "(0)" to "(9)" scale rating is used to indicate the activity of potential growth promotants. "(0)" indicates growth promotion within the range of 0–10% as compared with the control, whereas "(9)" indicates 90% or greater growth promotion as compared with the control.

The particular active compounds tested, the amounts used and the results obtained can be seen from the following Table 2.

TABLE 2

| Active compounds | Concentration (p.p.m.) | | | | | | | | |
|---|---|---|---|---|---|---|---|---|---|
| | 10,000 | | | 1,000 | | | 100 | | |
| | A | B | C | A | B | C | A | B | C |
| (1) Br-[thiophene]-$CH_2\overset{\oplus}{N}(n\text{-}Bu)_3 \cdot \overset{\ominus}{Cl}$ | 6 | 7 | 3 | 6 | 7 | 7 | 5 | 5 | 2 |
| (2) Br-[thiophene]-$CH_2\overset{\oplus}{N}(n\text{-}Bu)_3 \cdot \overset{\ominus}{NO_3}$ | 4 | 7 | 9 | 2 | 5 | 6 | 0 | 0 | 0 |
| (3) Br-[thiophene]-$CH_2\overset{\oplus}{N}(n\text{-}Bu)_3 \cdot S\overset{\ominus}{CN}$ | 3 | 6 | 7 | 1 | 5 | 5 | 1 | 2 | 0 |
| (4) Cl-[thiophene]-$CH_2\overset{\oplus}{N}(n\text{-}Bu)_3 \cdot \overset{\ominus}{Cl}$ | * | * | * | 2 | 6 | 8 | 0 | 4 | 5 |
| (5) Cl-[thiophene]-Cl with $CH_2\overset{\oplus}{N}(n\text{-}Pr)_3 \cdot \overset{\ominus}{Cl}$ | 5 | 7 | 8 | 3 | 6 | 6 | 2 | 3 | 3 |
| (6) Cl-[thiophene]-$CH_2\overset{\oplus}{N}(i\text{-}C_5H_{11})_3 \cdot \overset{\ominus}{Cl}$ | (¹) | (¹) | (¹) | 5 | 6 | 8 | 2 | 3 | 4 |
| (7) Br-[thiophene]-$CH_2\overset{\oplus}{N}(i\text{-}C_5H_{11})_3 \cdot \overset{\ominus}{Cl}$ | (¹) | (¹) | (¹) | 4 | 5 | 8 | 2 | 3 | 4 |
| (8) Br-[thiophene]-$CH_2\overset{\oplus}{N}(i\text{-}Bu)_2(CH_3) \cdot \overset{\ominus}{Cl}$ | 4 | 6 | 7 | 2 | 3 | 3 | 0 | 0 | 0 |
| (9) Br-[thiophene]-Br with $CH_2\overset{\oplus}{N}(n\text{-}Pr)_3 \cdot \overset{\ominus}{Cl}$ | (¹) | (¹) | (¹) | 5 | 8 | 8 | 4 | 7 | 7 |
| (10) Br-[thiophene]-$CH_2\overset{\oplus}{N}Et_3 \cdot \overset{\ominus}{Cl}$ | 3 | 3 | 1 | 2 | 2 | 0 | 1 | 0 | 0 |
| (11) Br-[thiophene]-Br with $CH_2\overset{\oplus}{N}(n\text{-}Bu)_3 \cdot \overset{\ominus}{Cl}$ | (¹) | (¹) | (¹) | (¹) | (¹) | (¹) | 1 | 1 | 4 |
| (12) Br-[thiophene]-$CH_2\overset{\oplus}{N}(n\text{-}Pr)_3 \cdot \overset{\ominus}{Cl}$ | (¹) | (¹) | (¹) | 1 | 4 | 2 | 0 | 1 | 1 |
| (13) Br-[thiophene]-$CH_2\overset{\oplus}{N}(CH_3)(n\text{-}Bu)_2 \cdot \overset{\ominus}{Cl}$ | (¹) | (¹) | (¹) | 1 | 4 | 1 | 0 | 1 | 2 |
| (14) Br-[thiophene]-$CH_2\overset{\oplus}{N}(Et)_2\text{-}CH_2CH=CH_2 \cdot \overset{\ominus}{Cl}$ | 4 | 4 | 4 | 1 | 2 | 1 | 0 | 1 | 0 |
| (15) Br-[thiophene]-$CH_2\overset{\oplus}{N}(Et)(i\text{-}Pr)_2 \cdot \overset{\ominus}{Cl}$ | 2 | 4 | 3 | 0 | 1 | 0 | 0 | 0 | 0 |
| (16) Cl-[thiophene]-$CH_2\overset{\oplus}{N}(CH_3)_2\text{-}[thiophene] \cdot \overset{\ominus}{Cl}$ | 1 | 3 | 2 | 0 | 0 | 0 | 0 | 0 | 0 |

TABLE 2—Continued

| Active compound | 10,000 A | 10,000 B | 10,000 C | 1,000 A | 1,000 B | 1,000 C | 100 A | 100 B | 100 C |
|---|---|---|---|---|---|---|---|---|---|
| (17) Br-thiophene-CH₂N⁺(CH₃)₂(C₆H₄S)·Cl⁻ | 0 | 4 | 2 | 0 | 0 | 0 | 0 | 0 | 0 |
| (18) Cl-thiophene-CH₂N⁺(Et)₂Me·Cl⁻ | (¹) | (¹) | (¹) | 0 | 0 | (¹) | 0 | 0 | (¹) |
| (19) Br-thiophene-CH₂N⁺(Et)₂Me·Cl⁻ | (¹) | (¹) | (¹) | 0 | 0 | (¹) | 0 | (¹) | 0 |
| (22) thiophene-CH₂N⁺Et₃·Cl⁻ | 0 | 1 | 1 | 0 | 0 | 0 | (¹) | (¹) | 0 |
| (23) Cl-thiophene-Cl, CH₂N⁺Et₃·Cl⁻ | 1 | 3 | 1 | 2 | 3 | 3 | 1 | 0 | 0 |
| (24) thiophene-CH₂N⁺(n-Bu)₃·Cl⁻ | (¹) | (¹) | (¹) | 1 | 3 | 2 | 0 | 1 | 0 |
| (25) Br-thiophene-CH₂N⁺Me₃·Cl⁻ | (¹) | (¹) | (¹) | 0 | 0 | 1 | (¹) | 0 | 0 |
| (26) Cl-thiophene-Cl, CH₂N⁺(n-Bu)₃·Cl⁻ | (¹) | (¹) | (¹) | (¹) | (¹) | (¹) | 0 | 0 | 2 |
| (27) Cl-thiophene-CH₂N⁺(n-Pr)₃·Cl⁻ | 2 | 6 | 6 | 0 | 0 | 1 | 0 | 0 | 0 |
| (28) Cl-thiophene-CH₂N⁺(nBu)₂CH₃·Cl⁻ | (¹) | (¹) | (¹) | 2 | 3 | 3 | 0 | 0 | 0 |
| (29) Cl-thiophene-Cl, CH₂N⁺(nBu)₂CH₃·Cl⁻ | (¹) | (¹) | (¹) | 2 | 4 | 3 | (¹) | 0 | 0 |
| (30) Cl-thiophene-CH₂N⁺(n-C₅H₁₁)₃·Cl⁻ | (¹) | (¹) | (¹) | (¹) | (¹) | (¹) | 0 | 1 | 1 |
| (32) Br-thiophene-CH₂N⁺Me₃·NO₃⁻ | (¹) | (¹) | (¹) | 1 | 1 | 1 | 0 | 0 | 1 |
| (33) Cl-thiophene-Cl, CH₂N⁺Me₃·Cl⁻ | (¹) | (¹) | (¹) | (¹) | (¹) | (¹) | 0 | 2 | 1 |
| (34) Cl-thiophene-Cl, CH₂N⁺(i-C₅H₁₁)₃·Cl⁻ | (¹) | (¹) | (¹) | (¹) | (¹) | (¹) | 2 | 2 | 3 |

See footnote at end of table.

TABLE 2—Continued

| Active compound | Concentration (p.p.m.) | | | | | | | | |
|---|---|---|---|---|---|---|---|---|---|
| | 10,000 | | | 1,000 | | | 100 | | |
| | A | B | C | A | B | C | A | B | C |
| (38) Cl—[thiophene]—CH₂N(t-Bu)₂·Cl with CH₃ | 3 | 4 | 5 | 0 | 0 | 1 | 0 | 1 | 0 |
| (39) Cl—[thiophene]—Cl, CH₃, CH₂N(t-Bu)₂·Cl | 3 | 5 | 4 | 0 | 0 | 0 | 0 | 0 | 0 |
| (42) Br—[thiophene]—CH₂N(CH₂C≡CH)₃·Cl | 1 | 1 | 1 | 0 | 1 | 0 | 0 | 0 | 0 |
| (45) Cl—[thiophene]—CH₂N(CH₂CH₃)(phenyl)(morpholino)·Cl | 0 | 2 | 1 | 0 | 2 | 2 | 0 | 1 | 0 |
| (46) Br—[thiophene]—CH₂N(CH₂CH₃)(phenyl)(morpholino)·Cl | 0 | 0 | 0 | 0 | 1 | 1 | 0 | 0 | 0 |
| (47) Cl—[thiophene]—CH₂N(CH₂CH=CH₂)₃·Cl | 0 | 0 | 0 | 3 | 1 | 1 | 3 | 0 | 0 |
| (48) Br—[thiophene]—CH₂N(CH₂CH=CH₂)₃·Cl | 1 | 0 | 0 | 3 | 1 | 0 | 2 | 0 | 0 |
| (49) Cl—[thiophene]—CH₂N(CH₂CH=CH₂)₃·Cl | 1 | 0 | 0 | 3 | 0 | 0 | 2 | (1) | 0 |

¹ Indicates compound was phytotoxic.

EXAMPLE 3

Pole Bean Foliar Spray Test

Wettable powder base consisting of:

92 parts by weight hydrated silica (ultra fine, "Hi-Sil 233")

4 parts by weight sodium lignin sulfonate ("Marasperse N")

4 parts by weight polycondensate of ethylene oxide, propylene oxide and propylene glycol (Mol. wt. about 1000) ("Pluronic L-61")

To produce a suitable preparation of the particular active compound, 1 part by weight of such active compound is mixed intimately with 1 part by weight of the stated wettable powder base, and the resulting mixture is diluted with water, containing 0.01% polyoxyethylene sorbitan monolaurate (Tween 20) as emulsifier, to the desired final concentration.

Pole bean plants, as soon as the primary leaves are relatively smooth (6–8 days old) and are capable of absorbing and translocating chemicals, are sprayed (treated) with the given active compound preparation at the indicated concentration until just dew moist. For each test 40 mls. of the appropriate compound dilution are sprayed on 4 plants in an area of five square feet.

The so-treated plants are moved to a greenhouse and remain there for 10 to 14 days. The degree of growth response is determined by measuring three parameters: total plant height (A), length of second node to apex (B), and petiol length of the first trifoliate leaves (C).

A "0" to "9" scale reading is used to express the degree of potential growth retardation. A "0" scale reading indicates growth retardation within the range of 1% to 10% as compared with the control. A "9" scale reading corresponds to 90% or more growth retardation.

A "(0)" to "(9)" scale rating is used to indicate the activity of potential growth promotants. "(0)" indicates growth promotion within the range of 0–10% as compared with the control, whereas "(9)" indicates 90% or greater growth promotion as compared with the control.

The particular active compounds tested, the amounts used and the results obtained can be seen from the following Table 3.

TABLE 3.—POLE BEAN FOLIAR SPRAY TEST

| Active compound | Conc. (p.p.m.) | Plant height (cm.) (A) | 2d intermedial distance (cm.) (B) | Petiol length of trifoliate leaf (cm.) (C) | Ratings A | B | C |
|---|---|---|---|---|---|---|---|
| (1)  | 10,000 | 7.0 | 2.7 | 0.8 | 8 | 9 | 8 |
|  | 1,000 | 9.5 | 4.2 | 2.0 | 7 | 8 | 7 |
|  | 100 | 15.7 | 10.8 | 6.2 | 5 | 6 | 1 |
| A. $ClCH_2CH_2NMe_3 \cdot \overset{\ominus}{Cl}$ (known) | 10,000 | 16.8 | 11.6 | 5.4 | 5 | 6 | 1 |
|  | 1,000 | 19.5 | 14.5 | 6.8 | 4 | 5 | 0 |
|  | 100 | | | | | | |
| Control | | 38.7 | 33.3 | 6.7 | | | |

EXAMPLE 4

Snapbean Yield Test

Solvent: 9.5 ml. of water containing 0.01% by weight of polyoxyethylene sorbitan monolaurate (Tween 20) as emulsifier.

To produce a suitable preparation of the particular active compound, 0.5 g. of such active compound mixed with the stated amount of solvent containing the stated amount of emulsifier, and the resulting solution is then further diluted with such solvent containing said emulsifier to provide the rate of application indicated below in p.p.m.

Snap bean plants, when 5% to 10% of the flowers are in bloom, are sprayed (treated) with the given active compound preparation at a rate of 92.625 decaliters per hectare. The control plots receive no such treatment.

At harvest time the fresh weight of fruit from the treated and untreated plots is determined. The increase in yield of the treated plots is expressed as a percentage of the control yield.

The particular active compound tested, the rate of application and the results obtained can be seen from the following Table 4.

TABLE 4.—SNAPBEAN YIELD TEST

| Active compound | P.p.m. of active compound applied | Percent increase of snap bean yield |
|---|---|---|
| (1) 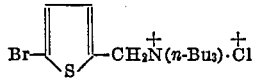 | 5 | 13 |
|  | 25 | 26 |
| Control | 0 | 0 |

EXAMPLE 5

Chemical mowing of Kentucky bluegrass

Solvent: 9.5 ml. of water containing 0.01% by weight of polyoxyethylene sorbitan monolaurate (Tween 20) as emulsifier.

To produce a suitable preparation of the particular active compound, 0.5 g. of such active compound is mixed with the stated amount of solvent containing the stated amount of emulsifier, and the resulting solution is then further diluted with such solvent containing said emulsifier to provide the rates of application indicated below in p.p.m.

The preparation of the mixture of the particular active compound with maleic hydrazide (MH-30) is made by mixing together one part by weight of the given active compound and three parts by weight of maleic hydrazide (MH-30), mixing 0.5 g. of the resulting mass with the stated amount of solvent containing the stated amount of emulsifier, and then further diluting the concentrate so produced with such solvent containing said emulsifier to provide the rates of application indicated below in p.p.m.

Growing bluegrass sod is sprayed with the particular active compound preparation at the concentrations indicated. The treatment test plots are arranged in a randomized block design with 3 replications. The plots are mowed to a uniform height of 5 centimeters before spraying and then left for 5 weeks before readings are taken.

The degree of efficacy of the particular active compound is evaluated as follows:

(i) Grass growth by visual ratings that are based on a 0 to 100 scale, where 0 indicates no reduction in growth when compared with the control plots and 100 indicates complete suppression of additional grass growth.

(ii) In the case of the most active treatments, a clipping from a 30 cm. x 30 cm. area at a height of 2.45 cm. from the ground was taken to determine the foliage yield from each plot, and expressed as a percentage of the check.

The particular active compound tested, the rates of application and the results obtained can be seen from the following Table 5.

TABLE 5.—CHEMICAL MOWING OF KENTUCKY BLUEGRASS

| Active compound | Lbs./acre of— Active compound applied | Maleic hydrazide applied | Visual rating | Average fresh green weight of the clippings (g.) | Percent reduction in clipping weight |
|---|---|---|---|---|---|
| (1) 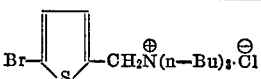 | 6.6 | 0 | 43 | 19 | 56 |
| (1) Same as above | 3.3 | 0 | 4 | | |
| (1) do | 0.825 | 2.475 | 20 | | |
| (1) do | 0 | 4.2 | 18 | | |
| (1) do | 0 | 2.5 | 10 | | |
| Control | 0 | 0 | | 43 | |

EXAMPLE 6

Chemical mowing of Merion bluegrass

Solvent: 9.5 ml. of water containing 0.1% by weight of polyoxyethylene sorbitan monolaurate (Tween 20) as emulsifier.

To produce a suitable preparation of the particular active compound, 0.5 g. of such active compound is mixed with the stated amount of solvent containing the stated amount of emulsifier, and the resulting solution is then further diluted with such solvent containing said emulsifier to provide the rates of application indicated below in p.p.m.

The preparation of the mixture of the particular active compound with maleic hydrazide (MH-30) is made by mixing together one part by weight of the given active compound and either 0.5 or 2 parts by weight of maleic hydrazide (MH-30), mixing 0.5 g. of the resulting mass with the stated amount of solvent containing the stated amount of emulsifier, and then further diluting the concentrate so produced with such solvent containing said emulsifier to provide the rates of application indicated below in p.p.m.

Growing bluegrass sod is sprayed with the particular active compound preparation at the concentrations indicated. The treatment test plots are arranged in a randomized block design with 3 replications. The plots are mowed to a uniform height of 5 centimeters before spraying and then left for 5 weeks before readings are taken.

The degree of efficacy of the particular active compound is evaluated as follows:

The height (in cm.) of plants in 3 randomized positions in each of the 3 replicates was measured and averaged to determine the average plant height in each plot, and the data expressed as a percentage height reduction when compared with the untreated check.

The particular active compound tested, the rates of application and the results obtained can be seen from the following Table 6.

EXAMPLE 7

Chemical pruning of elm trees

Solvent: 9.5 ml. of water containing 0.01% by weight of polyoxyethylene sorbitan monolaurate (Tween 20) as emulsifier.

To produce a suitable preparation of the particular active compound, 0.5 g. of such active compound is mixed with the stated amount of solvent containing the stated amount of emulsifier, and the resulting solution is then further diluted with such solvent containing said emulsifier to provide the rates of application indicated below in p.p.m.

The preparation of the mixture of the particular active compound with maleic hydrazide (MH-30) is made by mixing together one part by weight of the given active compound and 3 parts by weight of maleic hydrazide (MH-30), mixing 0.5 g. of the resulting mass with the stated amount of solvent containing the stated amount of emulsifier, and then further diluting the concentrate so produced with such solvent containing said emulsifier to provide the rates of application indicated below in p.p.m.

Three-year-old American elm trees are used as test plants. The treatments are applied by spraying the given preparation on 2 limbs per tree with 3 replications. The retardation of twig growth is determined by measuring the length of the twig 17 weeks after treatment and comparing it to the length of the same twig before treatment. The percentage growth of the twig is compared with the percentage growth of untreated twigs, and the result expressed as percent inhibition of growth of the treated twigs.

The particular active compound tested, the rates of application and the results obtained can be seen from the following Table 7.

TABLE 7.—CHEMICAL PRUNING OF ELM TREES
[Means of 2 tests]

| Active compound | Active compound applied (p.p.m.) | Plant height (cm.) | Percentage inhibition of growth of treated twig |
|---|---|---|---|
| (1) $Br-\underset{S}{\bigcirc}-CH_2\overset{\oplus}{N}(n-Bu)_3 \cdot \overset{\ominus}{Cl}$ | 4,000 | 19.9 | 30 |
| (1) same as above | 2,500 | 20.1 | 29 |
| (1) do | 200 | 19.0 | 33 |
| Control | 0 | 28.5 | |

EXAMPLE 8

Pea Yield Test

Solvent: 9.5 ml. of water containing 0.01% by weight of polyoxyethylene sorbitan monolaurate (Tween 20) as emulsifier.

TABLE 6.—CHEMICAL MOWING OF MERION BLUEGRASS

| Active compound | Active compound applied (p.p.m.) | Maleic hydrazide applied (p.p.m.) | Height (cm.) | Percent height reduction |
|---|---|---|---|---|
| (1) $Br-\underset{S}{\bigcirc}-CH_2\overset{\oplus}{N}(n-Bu)_3 \cdot \overset{\ominus}{Cl}$ | 5,000 | 0 | 15.0 | 20 |
| (1) Same as above | 2,500 | 0 | 18.5 | (1) |
| (1) do | 1,250 | 0 | 21.6 | (1) |
| (1) do | 1,667 | 3,333 | 12.4 | 34 |
| (1) do | 167 | 333 | 19.0 | (1) |
| (1) do | 17 | 33 | 17.5 | (1) |
| (1) do | 3,333 | 1,667 | 14.0 | 26 |
| (1) do | 333 | 167 | 19.0 | (1) |
| (1) do | 33 | 17 | 16.0 | 15 |
| (1) do | 0 | 5,000 | 13.0 | 31 |
| (1) do | 0 | 2,500 | 15.2 | 18 |
| (1) do | 0 | 50 | 18.0 | (1) |
| Control | 0 | 0 | 18.8 | 0 |

1 Indicates no significant height reduction.

To produce a suitable preparation of the particular active compound 0.5 g. of such active compound is mixed with the stated amount of solvent containing the stated amount of emulsifier, and the resulting solution is then further diluted with such solvent containing said emulsifier to provide the rate of application indicated below in p.p.m.

Pea plants, when 5% to 10% of the flowers are in bloom, are sprayed (treated) with the given active compound preparation at a rate of 92.625 decaliters per hectare. The treatment plots are arranged in a randomized block design with 3 replications. The control plots receive no such treatment.

At harvest time the fresh weight of fruit from the treated and untreated plots is determined. The increase in yield of the treated plots is expressed as a percentage of the control yield.

The particular active compound tested, the rate of application and the results obtained can be seen from the following Table 8.

moist. For each test 40 mls. of the appropriate compound dilution are sprayed on 4 plants in an area of five square feet.

The so-treated plants are moved to a greenhouse and remain there for 2–2½ weeks. The sex of the flowers at each node is determined by observation and compared with the check.

The particular active compounds tested, the amounts used and the results obtained can be seen from the following Table 9.

TABLE 9.—CUCUMBER SEX EXPRESSION TEST

| Active compound | Active compound applied (p.p.m.) | Plant height (cm.) | Node number | | | | | | | | |
|---|---|---|---|---|---|---|---|---|---|---|---|
| | | | 1 | 2 | 3 | 4 | 5 | 6 | 7 | 8 | 9 |
| (1) 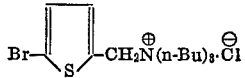 | 800 | 41.3 | F | F | M | M | F | F | M | F | M |
| Control | 0 | 45.2 | M | M | M | M | F | M | F | M | M |

EXAMPLE 10

Winter Wheat Growth Test

Wettable powder base consisting of:

92 parts by weight hydrated silica (ultra fine, "Hi-Sil 233")

4 parts by weight sodium lignin sulfonate ("Marasperse N")

4 parts by weight polycondensate of ethylene oxide, pro-

TABLE 8.—PEA YIELD TEST

| Active compound | Active compound applied (p.p.m.) | Yield (g./plot) | Percent increase of pea yield |
|---|---|---|---|
| (1) 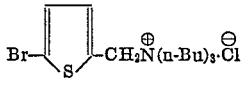 | 250 | 2,828 | |
| (1) Same as above | 50 | 2,808 | |
| (1) do | 10 | 3,085 | 9 |
| Control | 0 | 2,821 | |

EXAMPLE 9

Cucumber Sex Expression Test

Wettable powder base consisting of:

92 parts by weight hydrated silica (ultra fine, "Hi-Sil 233")

4 parts by weight sodium lignin sulfonate ("Marasperse N")

4 parts by weight polycondensate of ethylene oxide, propylene oxide and propylene glycol (mol. wt. about 1000) ("Pluronic L-61")

To produce a suitable preparation of the particular active compound, 1 part by weight of such active compound is mixed intimately with 1 part by weight of the stated wettable powder base, and the resulting mixture is diluted with water, containing 0.01 polyoxyethylene sorbitan monolaurate (Tween 20) as emulsifier, to the desired final concentration.

Cucumber plants (Variety S.N.R. 58), at the two-true leaf stage, i.e., when the plants are about 6–7 days old and are capable of absorbing and translocating chemicals, are sprayed (treated) with the given active compound preparation at the indicated concentration until just dew pylene oxide and propylene glycol (mol. wt. about 1000) ("Pluronic L-61")

To produce a suitable preparation of the particular active compound, 1 part by weight of such active compound is mixed intimately with 1 part by weight of the stated wettable powder base, and the resulting mixture is diluted with water, containing 0.01% polyoxyethylene sorbitan monolaurate (Tween 20) as emulsifier, to the desired final concentration.

Winter wheat plants, at the 2–3 leaf stage, i.e., when the plants are about 2 weeks old and are capable of absorbing and translocating chemicals, are sprayed (treated) with the given active compound preparation at the indicated concentration until just dew moist. For each test 40 mls. of the appropriate compound dilution are sprayed on 4 plants in an area of five square feet.

The so-treated plants are moved to a greenhouse and remain there for 14–17 days. The degree of growth response is determined by measuring three parameters: total plant height, fresh plant weight and fresh root weight.

Using these parameters, the height reduction of the plant (as compared to the control) and the root/top ratio, are calculated and expressed as percentages.

The particular active compounds tested, the amounts used and the results obtained can be seen from the following Table 10.

EXAMPLE 12
Cotton yield test

Solvent: 9.5 ml. of water containing 0.01% by weight of polyoxyethylene sorbitan monolaurate (Tween 20) as emulsifier.

TABLE 10

| Active compound | P.p.m. of active compound applied | Plant height (cm.) | Percentage height reduction (compared to control) | Fresh plant weight (g.) | Fresh root weight (g.) | Root/top ratio |
|---|---|---|---|---|---|---|
| (1) Br—[thiophene]—$CH_2\overset{\oplus}{N}(n\text{-}Bu)_3 \cdot \overset{\ominus}{Cl}$ | 10,000 | 17.8 | 36.4 | 14.3 | 5.3 | 58.3 |
|  | 5,000 | 24.2 | 13.6 | 15.8 | 6.3 | 65.8 |
|  | 1,000 | 21.8 | 22.1 | 16.5 | 7.0 | 73.7 |
| (A) $ClCH_2CH_2\overset{\oplus}{N}Me_3 \cdot \overset{\ominus}{Cl}$ (known) | 10,000 | 22.3 | 20.4 | 18.5 | 5.1 | 38.3 |
|  | 5,000 | 20.5 | 26.8 | 14.5 | 4.4 | 46.7 |
|  | 1,000 | 22.5 | 19.6 | 15.8 | 5.8 | 57.5 |
| Control | | 28.0 | | 17.0 | 7.5 | 78.9 |

EXAMPLE 11
Chemical pruning of Lombardy poplar trees

Solvent: 9.5 ml. of water containing 0.05% by weight of polyoxyethylene sorbitan monolaurate (Tween 20) as emulsifier.

To produce a suitable preparation of the particular active compound, 0.5 g. of such active compound is mixed with the stated amount of solvent containing the stated amount of emulsifier, and the resulting solution is then further diluted with such solvent containing said emulsifier to provide the rates of application indicated below in p.p.m.

One-year-old Lombardy poplar whips are used as test plants. The trees were pruned back to a uniform height of 91.4 cm. and all lateral branches removed about 1 month before treatment. The entire tree was sprayed in a foliar application with 3 replications, to run-off. The retardation of growth is determined by measuring the length of the terminal branch at treatment and again after 6 weeks and after 17 weeks, and thus determining the growth which had occurred after treatment. The growth of this branch is compared with the growth of the terminal branch of untreated trees and expressed as percent inhibition of growth.

To produce a suitable preparation of the particular active compound, 0.5 g. of such active compound is mixed with the stated amount of solvent containing the stated amount of emulsifier, and the resulting solution is then further diluted with such solvent containing said emulsifier to provide the rates of application indicated below in p.p.m.

Cotton plants of the variety Acola 1517C are used as test plants, and are sprayed (treated) with the given active compound preparation at a rate of 185.25 decaliters per hectare, at the initial squaring stage, approximately 60 days after planting. The treatment plots are arranged in a randomized block design with three replications. The control plots receive no such treatment.

The degree of efficacy of the given active compound is determined by weighing the seed cotton harvested from the given plot. This data is converted to kilograms of cotton yield per hectare, assuming a 35% gin turnout. The percentage increase of cotton lint, when compared with the untreated check, was also determined.

The particular active compound tested, the rates of application and the results obtained can be seen from the following Table 12.

TABLE 12.—COTTON YIELD TEXT

| Active compound | Active compound applied (p.p.m.) | Grams of seed cotton/100 ft. of row | Kg. lint/ hectare | Percent of check |
|---|---|---|---|---|
| (1) Br—[thiophene]—$CH_2\overset{\oplus}{N}(n\text{-}Bu)_3 \cdot \overset{\ominus}{Cl}$ | 5,000 | 27.7 | 1,419 | 108.6 |
|  | 500 | 29.2 | 1,496 | 114.5 |
| (A) $ClCH_2CH_2\overset{\oplus}{N}Me_3 \cdot \overset{\ominus}{Cl}$ (known) | 10,000 | 0.0 | 0 | 0 |
|  | 5,000 | 1.1 | 56 | 4.3 |
|  | 1,000 | 18.0 | 921 | 70.6 |
| Control | | 25.5 | 1,306 | |

The particular compound tested, the rate of application and the results obtained can be seen from the following Table 11.

TABLE 11

| Active compound | Active compound applied (p.p.m.) | 6-week growth (cm.) | 17-week growth (cm.) | Final growth (percent of check) |
|---|---|---|---|---|
| (1) Br—[thiophene]—$CH_2\overset{\oplus}{N}(n\text{-}Bu)_3 \cdot \overset{\ominus}{Cl}$ | 8,000 | 30.5 | 36.3 | 58.8 |
| Control | | 38.9 | 61.7 | |

EXAMPLE 13

Soybean yield test

Solvent: 9.5 ml. of water containing 0.01% by weight of polyoxyethylene sorbitan monolaurate (Tween 20) as emulsifier.

To produce a suitable preparation of the particular active compound, 0.5 g. of such active compound is mixed with the stated amount of solvent containing the stated amount of emulsifier, and the resulting solution is then further diluted with such solvent containing said emulsifier to provide the rates of application indicated below in gm./hectare.

Soybean plants of the variety Chippewa 64 are used as test plants, and are sprayed (treated) with the given active compound preparation at a rate of 110 liters per hectare. The treatment was made at a time when the plants were in the 6–8 trifoliate stage with about 50% of the plants having one or more flowers. The treatment plots are arranged in a randomized block design with four replications. The control plots receive no such treatment.

The degree of efficacy of the given active compound is determined by weighing the beans harvested from the given plot when compared with the untreated check plots.

The particular active compound tested, the rates of application and the results obtained can be seen from the following Table 13.

TABLE 13.—SOYBEAN YIELD TEST

| Active compound | Gm. of active compound/ hectare | Percent increase of soybean yield |
|---|---|---|
| (1) 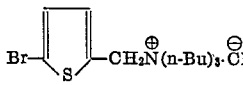 | 168 | 6 |
| Control | 0 | 0 |

EXAMPLE 14

(1) 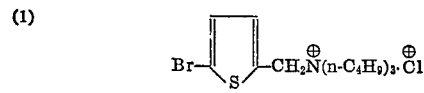

63.5 g. (0.3 M) of 2-bromo-5-thenyl chloride are dissolved in 200 ml. of anhydrous acetonitrile, and 55.5 g. (0.3 M) of tri-n-butyl amine are added. The mixture is heated under reflux for 20 hours.

After removal of the solvent under reduced pressure a pale brown precipitate is formed.

This was recrystallized from 250 ml. of a 4:1 mixture of ethyl acetate/acetonitrile.

101.1 g. (85% of the theory) of 2-bromo-5-thenyl tri-n-butyl ammonium chloride are obtained, M.P. 157°–159° C.

The following compounds are prepared in analogous manner:

| Compound number | Structure | M.P., °C. |
|---|---|---|
| (4) | 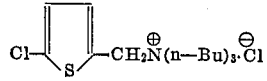 | 157–158 |
| (5) | 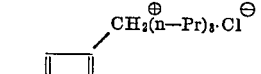 | 191.5–192(u) |
| (6) |  | 121–123 |
| (7) | 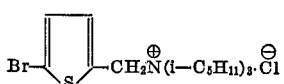 | 159–161 |
| (8) | 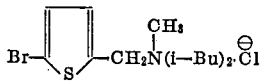 | 153–155(d) |
| (9) | 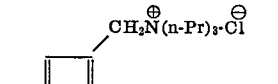 | 117–119 |
| (10) |  | (¹) |
| (11) | 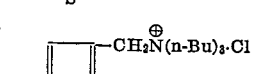 | 145–148 |
| (12) |  | 180.5–181(d) |
| (13) | 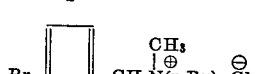 | 198–198.5(d) |
| (14) | 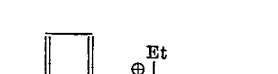 | 160 162(d) |
| (15) | 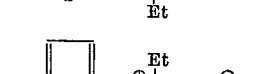 | 130–132 |
| (16) | 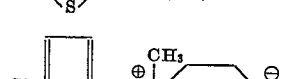 | 162–163 |
| (17) | 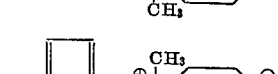 | 206(d) |
| (18) | 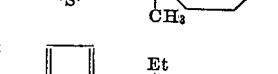 | 148–149 |
| (19) | 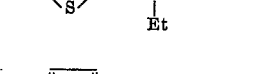 | 167–169 |
| (20) | 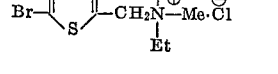 | 96–99 |
| (21) | 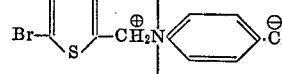 | 77–78 |

| Compound number | Structure | M.P., °C. |
|---|---|---|
| (22) | thiophene-CH₂N⁺Et₃·Cl⁻ | 55–58 |
| (23) | Cl-thiophene-Cl, CH₂N⁺Et₃·Cl⁻ | 172–175 |
| (24) | thiophene-CH₂N⁺(n-Bu)₃·Cl⁻ | 156–157 |
| (25) | Br-thiophene, CH₂N⁺Me₃·Cl⁻ | 186–189 |
| (26) | Cl-thiophene-Cl, CH₂N⁺(n-Bu)₃·Cl⁻ | 156–158 |
| (27) | Cl-thiophene-Cl, CH₂N⁺(n-Pr)₃·Cl⁻ | 172–174(d) |
| (28) | Cl-thiophene-Cl, CH₂N⁺(nBu)(CH₃)(n-Bu)·Cl⁻ | 160–161 |
| (30) | Cl-thiophene, CH₂N⁺(n-C₅H₁₁)₃·Cl⁻ | 127–129 |
| (31) | Br-thiophene, CH₂N⁺(n-C₅H₁₁)₃·Cl⁻ | 114–116 |
| (33) | Cl-thiophene-Cl, CH₂N⁺Me₃·Cl⁻ | 137–138 |
| (34) | Cl-thiophene-Cl, CH₂N⁺(i-C₅H₁₁)₃·Cl⁻ | 134–136 |
| (35) | Cl-thiophene, CH₂N⁺(Et)(Et)CH₂CH=CH₂·Cl⁻ | 118–122 |
| (36) | Br-thiophene, CH₂N⁺(Et)(Et)CH₂CH₂CN·Cl⁻ | 146–149 |
| (37) | Cl-thiophene, CH₂N⁺(Et)(Et)CH₂CH₂CN·Cl⁻ | 170–173 |
| (38) | thiophene, CH₂N⁺(CH₃)(i-Bu)₂·Cl⁻ | 130–134 |
| (39) | Cl-thiophene-Cl, CH₂N⁺(CH₃)(i-Bu)₂·Cl⁻ | 161–163 |
| (40) | Cl-thiophene-Cl, CH₂N⁺(Et)(morpholino ring)·Cl⁻ | 136–140 |
| (41) | Cl-thiophene, CH₂N⁺(CH₂C≡CH)₃·Cl⁻ | 125–127 |
| (42) | Br-thiophene, CH₂N⁺(CH₂C≡CH₃)·Cl⁻ | 120–121 |
| (43) | Cl-thiophene, CH₂N⁺(Et)(morpholino)·Cl⁻ | 140–144 |
| (44) | Br-thiophene, CH₂N⁺(Et)(morpholino)·Cl⁻ | 171 (d) |
| (45) | Cl-thiophene, CH₂N⁺(Ph)(morpholino)·Cl⁻ | 157–160 |
| (46) | Br-thiophene, CH₂N⁺(Ph)(morpholino)·Cl⁻ | 138–141 |
| (47) | Cl-thiophene, CH₂N⁺(CH₂CH=CH₂)₃·Cl⁻ | (¹) |
| (48) | Br-thiophene, CH₂N⁺(CH₂=CH₂)₃·Cl⁻ | (¹) |
| (49) | Cl-thiophene-Cl, CH₂N⁺(CH₂CH=CH₂)₃·Cl⁻ | (¹) |
| (50) | N≡C-thiophene, CH₂N⁺(n-Bu)₃·Cl⁻ | 166–168 |
| (51) | CH₃-thiophene-Br, CH₂N⁺(n-Bu)₃·Cl⁻ | 155–157 |
| (53) | i-BuOOC-thiophene, CH₂N⁺(n-Bu)₃·Cl⁻ | 135–137 |

| Compound number | Structure | M.P., °C |
|---|---|---|
| (54) | i-BuOOC—[S]—CH₂N⊕—(i-Am)₃·Cl⊖ | 152–154.2 |
| (55) | i-BuOOC—[S]—CH₂N⊕—(i-Bu)₂·Cl⊖<br>　　　　　　　　 CH₃ | 136–140 |

[1] Too hygroscopic.

EXAMPLE 15

(2) 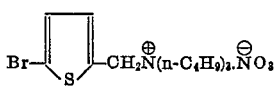

5.8 g. (0.034 M) of finely powdered silver nitrate are dissolved in boiling anhydrous ethanol (150 ml.). 13.4 g. (0.034 M) of 5-bromo-2-thenyl-tri-n-butyl ammonium chloride, prepared according to Example 14, was added to the boiling solution.

The white AgCl precipitate, which forms instantly, is allowed to age and then removed by filtration and discarded. The solvent is removed from the filtrate by stripping and the solid residue purified by recrystallization from ethyl acetate.

13.2 g. (94% of the theory) of 5-bromo-2-thenyl-tri-n-butyl ammonium nitrate are obtained, M.P. 114.5°–116° C.

The following compounds are prepared in analogous manner:

| Compound number | Structure | M.P., °C |
|---|---|---|
| (3) | Br—[S]—CH₂N⊕(n—Bu)₃·SCN⊖ | 109–111 |
| (32) | Br—[S]—CH₂NMe₃⊕·NO₃⊖ | 154–156 |
| (52) | Cl—[S]—CH₂N⊕(CH₃)(H)(CH₃)·S⊖C(=S)NMe₂ | 60–62 |
| (6) | Br—[S]—CH₂N⊕—(n—Bu)₃·N₃⊖ | 109–111 |
| (57) | Cl—[S]—CH₂N⊕—(n—Bu)₃·NO₃⊖ | 115–116.5 |
| (58) | Cl—[S]—CH₂N⊕—(n—Bu)₃·SCN⊖ | 87–89 |

It will be realized by the artisan that all of the foregoing compounds contemplated by the present invention possess one or more of the desired plant growth regulating properties, as well as a comparatively low phytotoxicity and a concomitantly low mammalian toxicity, enabling such compounds to be used with correspondingly favorable compatibility with warm-blooded creatures for more effective growth-regulating, e.g., growth promoting and growth retarding, purposes.

It will be appreciated that the instant specification and examples are set forth by way of illustration and not limitation, and that various modifications and changes may be made without departing from the spirit and scope of the present invention, which is to be limited only by the scope of the appended claims.

What is claimed is:

1. Quaternary thenyl ammonium salt of the formula

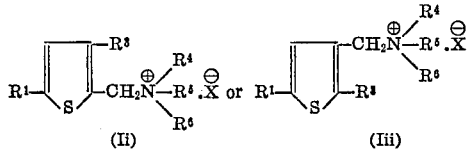

(Ii)　　　　　　(Iii)

in which

R⁴, R⁵ and R⁶ individually are n-butyl, n-propyl, isopropyl, iso-amyl, iso-butyl or methyl, provided that the total number of carbon atoms in $R^4$, $R^5$ and $R^6$ taken together lies between 9 and 15.

X⁻ is a chloride, nitrate or thiocyanate ion, and
　in Formula Ii $R^1$ is bromo or chloro, and $R^3$ is hydrogen, and
　in Formula Iii $R^1$ and $R^3$ are both chloro or both bromo.

2. Salt according to claim 1 in which said salt is (2-bromo-5-thenyl)-(tri-n-butyl)-ammonium chloride of the formula

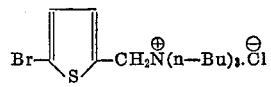

3. Salt according to claim 1 in which said salt is (2-bromo-5-thenyl)-(tri-n-butyl)-ammonium nitrate of the formula

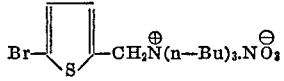

4. Salt according to claim 1 in which said salt is (2-bromo-5-thenyl)-(tri-n-butyl)-ammonium thiocyanate of the formula

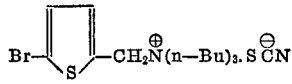

5. Salt according to claim 1 in which said salt is (2-chloro-5-thenyl)-(tri-n-butyl)-ammonium chloride of the formula

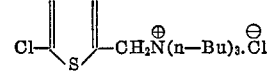

6. Salt according to claim 1 in which said salt is (2,5-dichloro-4-thenyl)-(tri-n-propyl)-ammonium chloride of the formula

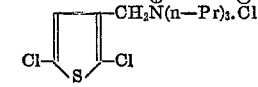

7. Salt according to claim 1 in which said salt is (2-chloro-5-thenyl)-(tris-iso-amyl)-ammonium chloride of the formula

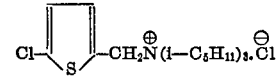

8. Salt according to claim 1 in which said salt is (2-bromo-5-thenyl)-(tris-iso-amyl)-ammonium chloride of the formula

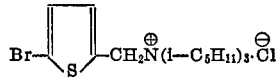

(References on following page)

References Cited

UNITED STATES PATENTS 2,548,898  4/1951  Kyrides ------------ 260—329

OTHER REFERENCES

Hartough, et al., Chem. Abs. 43:1763–4 (3/1949).
Hartough, et al. II, Chem. Abs. 45:151–2 (3/1951).
Weilmuenster, et al., Chem. Abs. 47:1686–7 (3/1953).
Smith, et al., Chem. Abs. 49:6221–2 (5/1955).
Gol'dfarb, et al., Chem. Abs. 55:13862–3 (10/1956).
Paul, et al., Chem. Abs. 70:3707s (1/1969).

HENRY R. JILES, Primary Examiner

C. M. S. JAISLE, Assistant Examiner

U.S. Cl. X.R.

260—247.1, 293.68, 326.84, 329 AM, 332.2 C; 71—90

UNITED STATES PATENT OFFICE
CERTIFICATE OF CORRECTION

Patent No. 3,748,343          Dated  July 24, 1973

Inventor(s)   Peter F. Epstein et al.

It is certified that error appears in the above-identified patent and that said Letters Patent are hereby corrected as shown below:

Col. 4, line 45  Compound (1), change "ethenyl" to --thenyl--.

Col. 5, line 66 Compound (55), change "dis" to --di--.

Col. 8, line 24, change "moving" to --mowing--.

Col. 9, line 61, change "wall" to --well--.

Col. 10, line 44, change "bol" to --mol--.

Col. 13, Compound (36), change formula from " 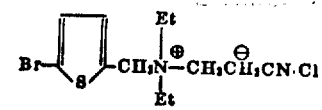 "

to -- 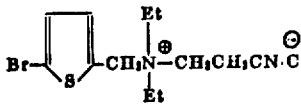 --.

Col. 13, Compound (37), under heading "Concentration(p.p.m.)"

insert --4-- under column "100"

Col. 15, Table 2, Compound (4). change " * * * * " to

-- (1)   (1)   (1)   (1) --.

Col. 15, Table 2, Compound (6), change formula from " 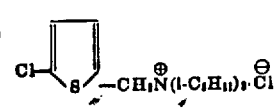

to -- 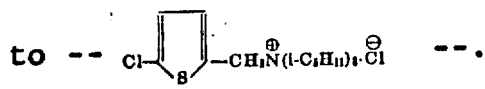 --.

Col. 21, line 51, before "mixed" insert -- is --.

Col. 23, line 1, change "Merion" to -- Marion --.

Col. 23, Table 6 - in the title, change "Merion" to --Marion--.

Col. 23, Table 6, delete decimal points in first two columns.

PO-1050
(5/69)

UNITED STATES PATENT OFFICE
CERTIFICATE OF CORRECTION

Patent No. __3,748,343__  Dated __July 24, 1973__

Inventor(s) __Peter F. Epstein et al__   Page 2

It is certified that error appears in the above-identified patent and that said Letters Patent are hereby corrected as shown below:

Col. 29, line 45, Example 14, Compound (1), change "$\overset{\oplus}{C}l$" to -- $\overset{\ominus}{C}l$ --.

Col. 29, Compound (5), in the formula, insert --N-- after "$CH_2$".

Col. 30, Compound (8), in the formula, under "N" insert --⊕--.

Col. 31, Compound (35), in the formula, between "CH" and "$CH_2$", change single bond "-" to double bond -- = --.

Col. 31, Compound (37), in the formula, change "$\overset{\oplus}{C}l$" to -- $\overset{\ominus}{C}l$ --.

Col. 31, Compound (38), in the formula, change "$\overset{\oplus}{C}l$" to -- $\overset{\ominus}{C}l$ --.

Col. 33, Compound (54) under heading "M.P., °C" change "154.2" to --154.5--.

Col. 33, Compound (52), in the formula, above "$H_2$" insert --⊕--.

Col. 33, Compound (6), insert --5-- before "6" (Compound (56)).

Same Compound (56), over "N" insert --⊕--.

Signed and sealed this 9th day of July 1974.

(SEAL)
Attest:

McCOY M. GIBSON, JR.
Attesting Officer

C. MARSHALL DANN
Commissioner of Patents